United States Patent
Long et al.

(10) Patent No.: US 12,274,260 B2
(45) Date of Patent: Apr. 15, 2025

(54) SYSTEM AND METHOD TO QUANTIFY SPRAY QUALITY

(71) Applicant: CNH Industrial America LLC, New Holland, PA (US)

(72) Inventors: Scott Allen Long, Plainfield, IL (US); Trevor Stanhope, Oak Lawn, IL (US); Nathan Brooks, Manitowoc, WI (US); Monte Gene Weller, Frankfort, IL (US)

(73) Assignee: CNH Industrial America LLC, New Holland, PA (US)

( * ) Notice: Subject to any disclaimer, the term of this patent is extended or adjusted under 35 U.S.C. 154(b) by 702 days.

(21) Appl. No.: 17/490,328

(22) Filed: Sep. 30, 2021

(65) Prior Publication Data
US 2022/0125033 A1  Apr. 28, 2022

Related U.S. Application Data

(60) Provisional application No. 63/106,061, filed on Oct. 27, 2020.

(51) Int. Cl.
| | | |
|---|---|---|
| A01M 7/00 | (2006.01) | |
| A01C 23/00 | (2006.01) | |
| A01C 23/04 | (2006.01) | |
| B05B 12/00 | (2018.01) | |
| B05B 12/08 | (2006.01) | |

(52) U.S. Cl.
CPC ......... *A01M 7/0089* (2013.01); *A01C 23/007* (2013.01); *B05B 12/008* (2013.01); *B05B 12/082* (2013.01); *A01C 23/047* (2013.01); *A01M 7/0042* (2013.01)

(58) Field of Classification Search
CPC . A01M 7/0089; A01M 7/0042; B05B 12/008; B05B 12/082; A01C 23/047
See application file for complete search history.

(56) References Cited

U.S. PATENT DOCUMENTS

| | | |
|---|---|---|
| 4,357,670 A | 11/1982 | McFarlane |
| 4,656,874 A | 4/1987 | Kulig |
| 5,574,657 A | 11/1996 | Tofte et al. |

(Continued)

FOREIGN PATENT DOCUMENTS

CN  105165786 B  3/2018

*Primary Examiner* — Thomas E Worden
*Assistant Examiner* — Jay Khandpur
(74) *Attorney, Agent, or Firm* — Dority & Manning, P.A.

(57) ABSTRACT

An agricultural application system can include a nozzle assembly positioned along a boom assembly and can be configured to selectively dispense an agricultural product therefrom. One or more sensors can be operably coupled with the boom assembly and configured to capture data associated with first and second application variables. A controller can be communicatively coupled to the one or more sensors. The controller can include a processor and associated memory. The memory can store instructions that, when implemented by the processor, configure the controller to receive the data associated with the one or more application variables and calculate the spray quality index. The first application variable can have a first scaling factor and a second application variable can have a second scaling factor. The second scaling factor may differ from the first scaling factor.

20 Claims, 6 Drawing Sheets

(56) References Cited

U.S. PATENT DOCUMENTS

| | | |
|---|---|---|
| 5,734,167 A | 3/1998 | Skelly |
| 5,884,205 A | 3/1999 | Elmore et al. |
| 8,260,507 B2 | 9/2012 | Schumann et al. |
| 8,701,574 B2 | 4/2014 | Ballard et al. |
| 9,366,389 B2 | 6/2016 | Stewart et al. |
| 10,173,236 B2 | 1/2019 | Preheim et al. |
| 2004/0215353 A1* | 10/2004 | Frerichs ............... G05B 23/024 700/20 |
| 2016/0136671 A1* | 5/2016 | Kocer ................... A01C 23/007 700/283 |
| 2016/0175869 A1 | 6/2016 | Sullivan et al. |
| 2016/0368011 A1* | 12/2016 | Feldhaus ............... B05B 12/124 |
| 2017/0197228 A1 | 7/2017 | Bjornson et al. |
| 2017/0251656 A1 | 9/2017 | Kolb et al. |
| 2018/0329436 A1 | 11/2018 | Auberg |
| 2019/0049559 A1* | 2/2019 | Hien ........................ G01S 13/88 |
| 2019/0150357 A1* | 5/2019 | Wu ........................ H04N 7/188 |
| 2019/0246557 A1* | 8/2019 | Booher ................ A01C 23/007 |
| 2020/0125872 A1* | 4/2020 | Jensen ............. G06K 19/06037 |
| 2021/0127567 A1 | 5/2021 | Loukili et al. |
| 2022/0101554 A1* | 3/2022 | Fu ....................... A01M 7/0042 |

\* cited by examiner

SYSTEM AND METHOD TO QUANTIFY SPRAY QUALITY

CROSS-REFERENCE TO RELATED APPLICATION

This application is a non-provisional application claiming the benefit of priority under 35 U.S.C. § 119(e) to U.S. Provisional Application No. 63/106,061, filed Oct. 27, 2020, which is hereby incorporated by reference in its entirety.

FIELD

The present disclosure generally relates to agricultural implements and, more particularly, to systems and methods for monitoring an agricultural product during a spray operation, such as by monitoring one or more application variables and altering various components.

BACKGROUND

Various types of work vehicles utilize applicators (e.g., sprayers, floaters, etc.) to deliver an agricultural product to a ground surface of a field. The agricultural product may be in the form of a solution or mixture, with a carrier (such as water) being mixed with one or more active ingredients, such as a pesticide(s) (e.g., an herbicide(s), insecticide(s), rodenticide(s), etc.) and/or a nutrient(s).

The applicators may be pulled as an implement or self-propelled, and can include a tank, a pump, a boom assembly, and one or more nozzle assemblies carried by the boom assembly at spaced locations. The boom assembly can include a pair of boom arms, with each boom arm extending to either side of the applicator when in an unfolded state. Each boom arm may include multiple boom sections, each with a number of spray nozzle assemblies (also sometimes referred to as spray tips).

The spray nozzle assemblies on the boom assembly disperse the agricultural product carried by the applicator onto a field. During a spray operation, however, various factors may affect a quality of application of the agricultural product to the field. Accordingly, an improved system and method for monitoring the quality of application of the agricultural product to the field and quantifying the spray quality would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to an agricultural application system that can include a nozzle assembly positioned along a boom assembly and can be configured to selectively dispense an agricultural product therefrom. One or more sensors can be operably coupled with the boom assembly and configured to capture data associated with first and second application variables. A controller can be communicatively coupled to the one or more sensors. The controller can include a processor and associated memory. The memory can store instructions that, when implemented by the processor, configure the controller to receive the data associated with the one or more application variables and calculate the spray quality index. The first application variable can have a first scaling factor and a second application variable can have a second scaling factor. The second scaling factor may differ from the first scaling factor.

In some aspects, the present subject matter is directed to an agricultural work vehicle that can include a chassis supporting a cab and a boom assembly. One or more nozzle assemblies can be positioned along the boom assembly and can be configured to selectively dispense an agricultural product therefrom. A sensor can be operably coupled with the boom assembly and can be configured to capture data associated with one or more application variables. A controller can be communicatively coupled to the sensor. The controller can be configured to receive, from the sensor, the data associated with the one or more application variables and calculate a spray quality index defined between an upper integer and a lower integer based on the one or more application variables.

In some aspects, the present subject matter is directed to a method for monitoring a spray quality during a spray operation that can include dispensing an agricultural product from one or more nozzle assemblies along a boom assembly. The method can also include receiving, with one or more sensors, data indicative of one or more application variables. Lastly, the method can also include converting each of the one or more application variables to a scaled integer to determine a spray quality index.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
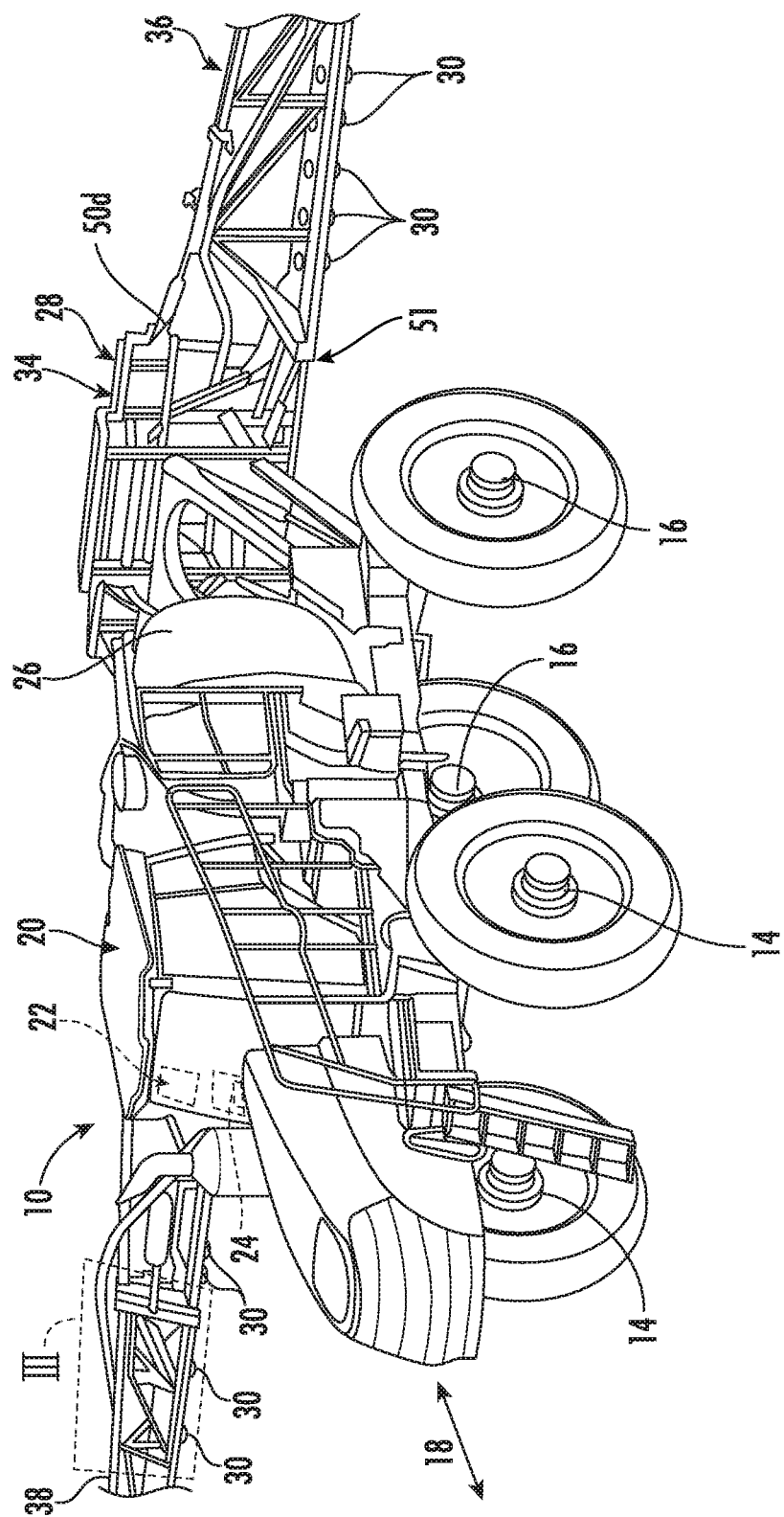
FIG. 1 illustrates a perspective view of some embodiments of a work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of some embodiments can be used with some embodiments to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for mitigating misapplications of an agricultural product to an underlying field during a spray operation, such as by monitoring one or more application variables during operation of the vehicle. In several embodiments, a boom assembly may be configured to couple with a work vehicle. The vehicle and/or the boom assembly includes one or more spray nozzle assemblies that disperse an agricultural product onto a field. During a spray operation, various application variables that may affect a spray quality index of application of the agricultural product to the field are monitored. The spray quality index can be defined as a predefined application rate/range that estimates whether a spray operation has led to appropriate coverage of a field, or a portion of the field, by the agricultural product based on a summation of monitored application variables. In some instances, the spray quality index can be a scaled integer based on the deviations of each variable from an optimal threshold or range defined between an upper threshold and a lower threshold for that respective variable to determine whether the agricultural product was appropriately applied or misapplied to various portions of the field.

In several embodiments, the one or more application variables that may affect the spray quality index can include at least one of a nozzle size and style, which agricultural product is being applied, an incorrect agricultural product application rate, inclement weather as determined by meeting one or more criteria, an agricultural product flow rate or pressure deviating from a predefined range, boom assembly movement (e.g., jounce) exceeding a movement range, a vehicle exceeding a predefined speed, a vehicle acceleration/ deceleration deviating from a predefined range, a turning radius exceeding predefined criteria, and/or any other variable.

In several embodiments, to monitor the application variables, one or more sensors and/or systems of the vehicle and/or the boom assembly may monitor a condition that effects the overall spray operation of the agricultural product. A controller is communicatively coupled to the one or more sensors and includes a processor and associated memory. The memory can store instructions that, when implemented by the processor, configure the controller to calculate an overall spray quality for various portions of the field, map the spray quality over a corresponding field map, generate a notification when the spray quality index and/or any of the application variables deviate from a predefined range and/or from a demanded application rate, and/or store each spray quality at geo-located vehicle positions. In some instances, the controller may also be configured to alter various components of the vehicle, such as a vehicle suspension, an agricultural product application system, a powertrain control system, steering system, and/or any other component of the vehicle. By adjusting any one or more of these systems, the controller may mitigate spray quality index deviations when potentially adverse conditions exist.

Figure 2:
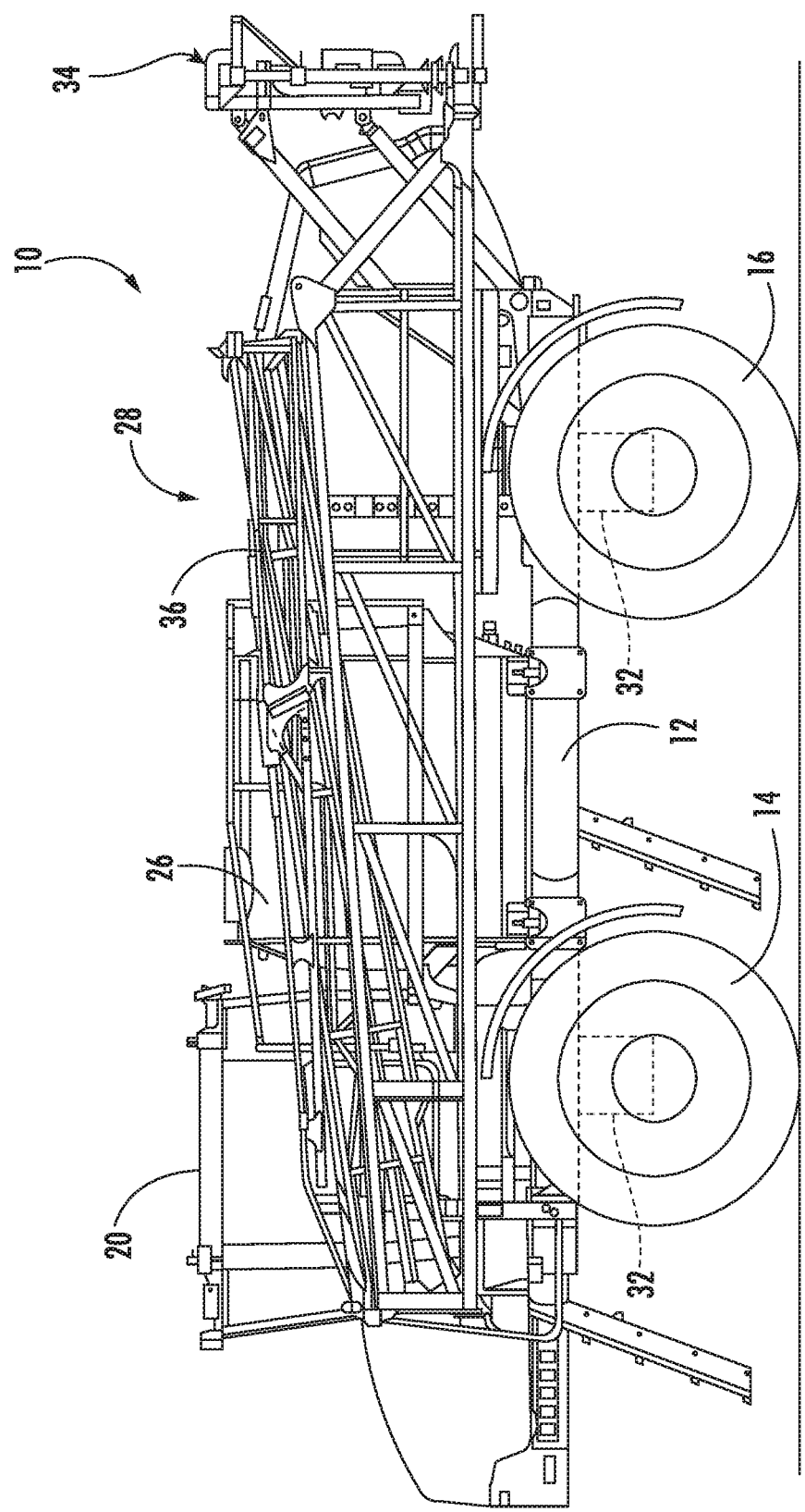
FIG. 2 illustrates a side view of the work vehicle in accordance with aspects of the present subject matter.

Referring now to FIGS. 1 and 2, a work vehicle 10 is generally illustrated as a self-propelled agricultural applicator. However, in alternate embodiments, the work vehicle 10 may be configured as any other suitable type of work vehicle 10 configured to perform agricultural spray operations, such as a tractor or other vehicle configured to haul or tow an application implement.

In various embodiments, the work vehicle 10 may include a chassis 12 configured to support or couple to one or more components. For example, front and rear wheels 14, 16 may be coupled to the chassis 12. The wheels 14, 16 may be configured to support the work vehicle 10 relative to a ground surface and move the work vehicle 10 in a direction of travel (e.g., as indicated by arrow 18 in FIG. 1) across a field or a ground surface. In this regard, the work vehicle 10 may include a power plant, such as an engine, a motor, or a hybrid engine-motor combination, to move the vehicle 10 along a field.

The chassis 12 may also support a cab 20, or any other form of operator's station, for permitting the operator to control the operation of the work vehicle 10. In the example shown in FIG. 1, the work vehicle 10 may include a human-machine interface (HMI) 22 for displaying messages and/or alerts to the operator and/or for allowing the operator to interface with the vehicle's controller 76 (FIG. 5), or receive a user input, through one or more user input devices 24 (e.g., levers, pedals, control panels, buttons, and/or the like) within the cab 20 and/or in any other practicable location.

The chassis 12 may also support one or more tanks, such as a rinse tank and/or a product tank 26, and a boom assembly 28. The product tank 26 is generally configured to store or hold an agricultural product, such as a pesticide(s) (e.g., an herbicide(s), insecticide(s), rodenticide(s), etc.) and/or a nutrient(s). The agricultural product is conveyed from the product tank 26 through plumbing components, such as interconnected pieces of tubing, for release onto the underlying field (e.g., plants and/or soil) through one or more nozzle assemblies 30 mounted on the boom assembly 28.

In some embodiments, to improve the agricultural product application quality and/or operator comfort, the vehicle 10 can be equipped with a passive, semi-active, or active vehicle suspension 32 to dampen movement of the vehicle 10 and/or the boom assembly 28 while operating the vehicle 10 and/or the boom assembly 28.

As shown in FIGS. 1 and 2, the boom assembly 28 can include a frame 34 that supports first and second boom arms 36, 38, which may be orientated in a cantilevered nature. The first and second boom arms 36, 38 are generally movable between an operative or unfolded position (FIG. 1) and an inoperative or folded position (FIG. 2). When distributing product, the first and/or second boom arm 36, 38 extends laterally outward from the work vehicle 10 to the operative position in order to cover wide swaths of the underlying ground surface, as illustrated in FIG. 1. However, to facilitate transport, each boom arm 36, 38 of the boom assembly 28 may be independently folded forwardly or rearwardly into the inoperative position, thereby reducing the overall width of the vehicle 10, or in some examples, the overall width of a towable implement when the applicator is configured to be towed behind the work vehicle 10. circuitry Referring to FIG. 3, the boom assembly 28 may be configured to support one or more nozzle assemblies 30. Each nozzle assembly 30 may, in turn, be configured to dispense the agricultural product stored within the tank 26 (FIG. 1) onto the underlying field 40 and/or plants 42. In several embodiments, the nozzle assemblies 30 may be mounted on and/or coupled to the first and/or second boom arms 36, 38 of the boom assembly 28, with the nozzle assemblies 30 being spaced apart from each other along a lateral direction 44. Furthermore, fluid conduits 46 may fluidly couple the nozzle assemblies 30 to the tank 26. In this respect, as the sprayer 10 travels across the field 40 in the direction of travel 18 (FIG. 1) to perform a spraying operation thereon, the agricultural product moves from the tank 26 through the fluid conduit(s) 46 to each of the nozzle assemblies 30. The nozzle assemblies 30 may, in turn, dispense or otherwise spray a fan 48 of the agricultural product onto the underlying field 40 and/or plants 42. For example, in some embodiments, the nozzle assemblies 30 may correspond to flat fan nozzles configured to dispense a flat fan 48 of the agricultural product. However, in alternative embodiments, the nozzle assemblies 30 may correspond to any other suitable types of nozzles, such as dual pattern nozzles and/or hollow cone nozzles.

During a spray operation, one or more sensors 50 and/or systems of the vehicle 10 and/or the boom assembly 28 may monitor a variable that affects the overall spray operation of the agricultural product. For example, in some embodiments, an orientation sensor 50a may be installed on the boom assembly 28 and/or at any other practicable location. The orientation sensor 50a is configured to detect movement and/or height variations of the boom assembly 28. In various examples, the orientation sensor 50a can be configured to output a signal indicative of a measured boom height, a measured pitch angle, a measured yaw angle, and/or a measured roll angle of the vehicle 10 and/or the boom assembly 28. For example, the orientation sensor 50a may include a boom height sensor, an accelerometer, a gyroscope, or other sensor configured to monitor the orientation and/or the height on the vehicle 10 and/or the boom assembly 28. The orientation information detected by the orientation sensor 50a may enable the vehicle 10 to more accurately predict the expected position of the boom assembly 28, thereby enhancing the efficiency of a spray operation.

In examples in which the orientation sensor 50a incorporates a height sensor, the height sensor may be configured as an ultrasonic transducer that sends sound waves toward the agricultural field 40 and receive the energy returned to the orientation sensor 50a. In some examples, various other sensors including acoustic, infrared, capacitance, optical, and the like may be utilized to determine the distance between the boom assembly 28 and the agricultural field 40. Additionally, and/or alternatively, the orientation sensor 50a may incorporate a position sensor that may be configured to detect the position of various portions of the boom assembly 28 relative to an adjacent boom portions and/or relative to the frame 34. For example, in some embodiments, the position sensor may be configured as a pressure sensor that is operably coupled with an actuator of the boom assembly 28 and/or positioned between two portions of the boom assembly 28 that are hingedly coupled to one another at a joint 51 (FIG. 1). In some embodiments, the position sensor may be configured as a strain gauge that detects strain indicative of the deflection of at least one of the boom arms at the joint 51 of the boom assembly 28. In various embodiments, the position sensor may be capacitive displacement sensors, Hall effect sensors, string potentiometers, or the like.

Additionally, and/or alternatively, in examples in which the orientation sensor 50a incorporates an accelerometer, the accelerometer may correspond to one or more multi-axis accelerometers (e.g., one or more two-axis or three-axis accelerometers) such that the accelerometer may be configured to monitor the acceleration of the vehicle 10 and/or the boom assembly 28 in multiple directions, such as by sensing the vehicle acceleration along three different axes. It will be appreciated, however, that the accelerometer may generally correspond to any suitable type of accelerometer without departing from the teachings provided herein.

Figure 3:
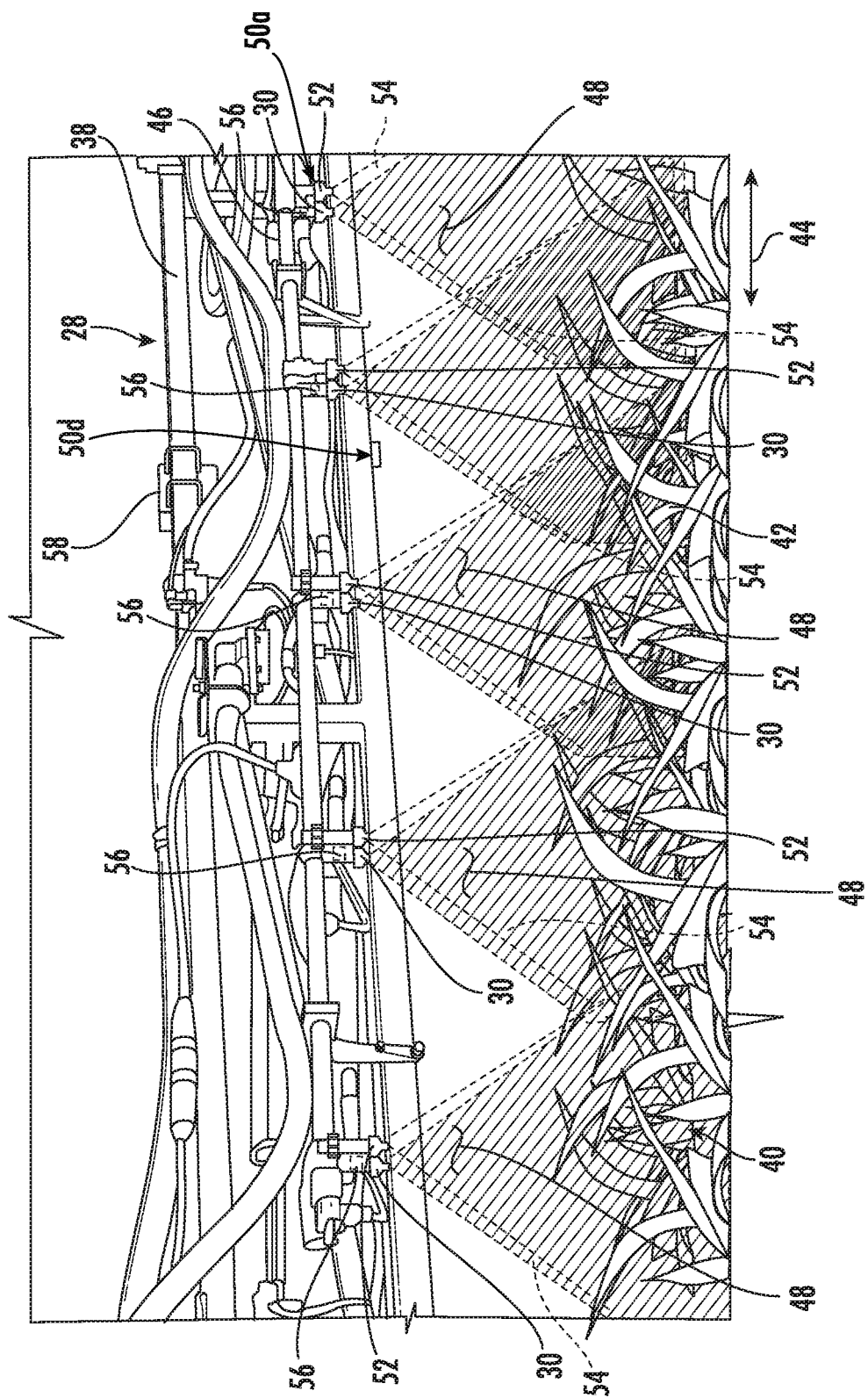
FIG. 3 is an enhanced view of section III of FIG. 1 illustrating a rear view of a portion of a boom assembly in accordance with aspects of the present subject matter.

With further reference to FIG. 3, in accordance with aspects of the present subject matter, one or more spray sensors 50b may be installed on the vehicle 10 and/or the boom assembly 28. In general, the spray sensors 50b may be configured to capture data indicative of one or more spray quality variables associated with the fans 48 of the agricultural product being dispensed by the nozzle assemblies 30. The spray quality variable(s) may, in turn, be indicative of the quality of the spraying operation, such as whether a target application rate of the agricultural product is being met.

In several embodiments, the spray sensors 50b may correspond to one or more imaging sensors 52. In such embodiments, each imaging sensor 52 may be coupled to or mounted on the boom assembly 28 such that the one or more fans 48 of the agricultural product are within an associated field of view 54. As such, each imaging sensor 52 may be configured to capture image data related to the one or more spray fans 48. As will be described below, a controller 76 may be configured to analyze the image data to determine one or more spray fan variables of the depicted spray fans 48. For example, such spray fan variables may include the shape of the spray fans 48, the size or width of the spray fans 48, the height of the spray fans 48, the size of the droplets/particles forming the spray fans 48, an inconsistency in such variables between two or more spray fans 48, an orifice type of the one or more nozzle assemblies 30, and/or a mixture of materials defining the agricultural product. In some embodiments, such as the example illustrated in FIG. 3, a single imaging sensor 52 is installed on the boom assembly 28 in a position to monitor a single spray fan 48. However, in alternative embodiments, any other suitable number of imaging sensors 52 may be installed on the boom assembly 28. Furthermore, any other suitable number of spray fans 48 may be positioned the field of view 54 of each imaging sensor 52.

The imaging sensors 52 may correspond to any suitable sensing devices configured to detect or capture images or other image-like data associated with the spray fans 48 present within its field of view 54. For example, in several embodiments, the imaging sensors 52 may correspond to a suitable camera configured to capture three-dimensional images of the spray fans 48 present within its field of view 54. For instance, in a particular embodiment, the imaging sensors 52 may correspond to a stereographic camera having two or more lenses with a separate image sensor for each lens to allow the camera to capture stereographic or three-dimensional images. However, in alternative embodiments, the imaging sensors 52 may correspond to any other suitable sensing devices configured to capture image or image-like data, such as a monocular camera, a LIDAR sensors, and/or a RADAR sensors.

In some embodiments, the spray sensors 50b may correspond to one or more pressure sensors 56. In general, the pressure sensors 56 may be configured to capture data indicative of the pressure of the agricultural product being supplied to the nozzle assemblies 30. As such, the pressure sensors 56 may be provided in fluid communication with one of the fluid conduits 46. For example, the pressure sensor 56 may correspond to a diaphragm pressure sensor, a piston pressure sensor, a strain gauge-based pressure sensor, an electromagnetic pressure sensor, and/or the like.

In a further embodiment, the spray sensors 50b may correspond to one or more airspeed sensors 58. In general, the airspeed sensors 58 may be configured to capture data indicative of the airspeed of the air flowing past the boom assembly 28 as the sprayer 10 travels in the direction of travel 18. The airspeed data may, in turn, be indicative of the speed at which the air moves relative the boom assembly 28. In this respect, airspeed data may take in account both the airflow caused by the movement of the sprayer 10 relative to the ground and the airflow caused by any wind that is present. For example, the airspeed sensors 58 may correspond to a pitot tube, an anemometer, and/or the like. As shown, the airspeed sensors 58 are mounted on the top of the boom assembly 28. However, in alternative embodiments, the airspeed sensors 58 may be installed on the sprayer 10 at any other suitable location(s). Moreover, in further embodiments, the spray sensors 50b may correspond to any other suitable sensors capable of capturing data indicative of the quality of the spray fans 48 emitted by the nozzle assemblies 30.

Figure 4:
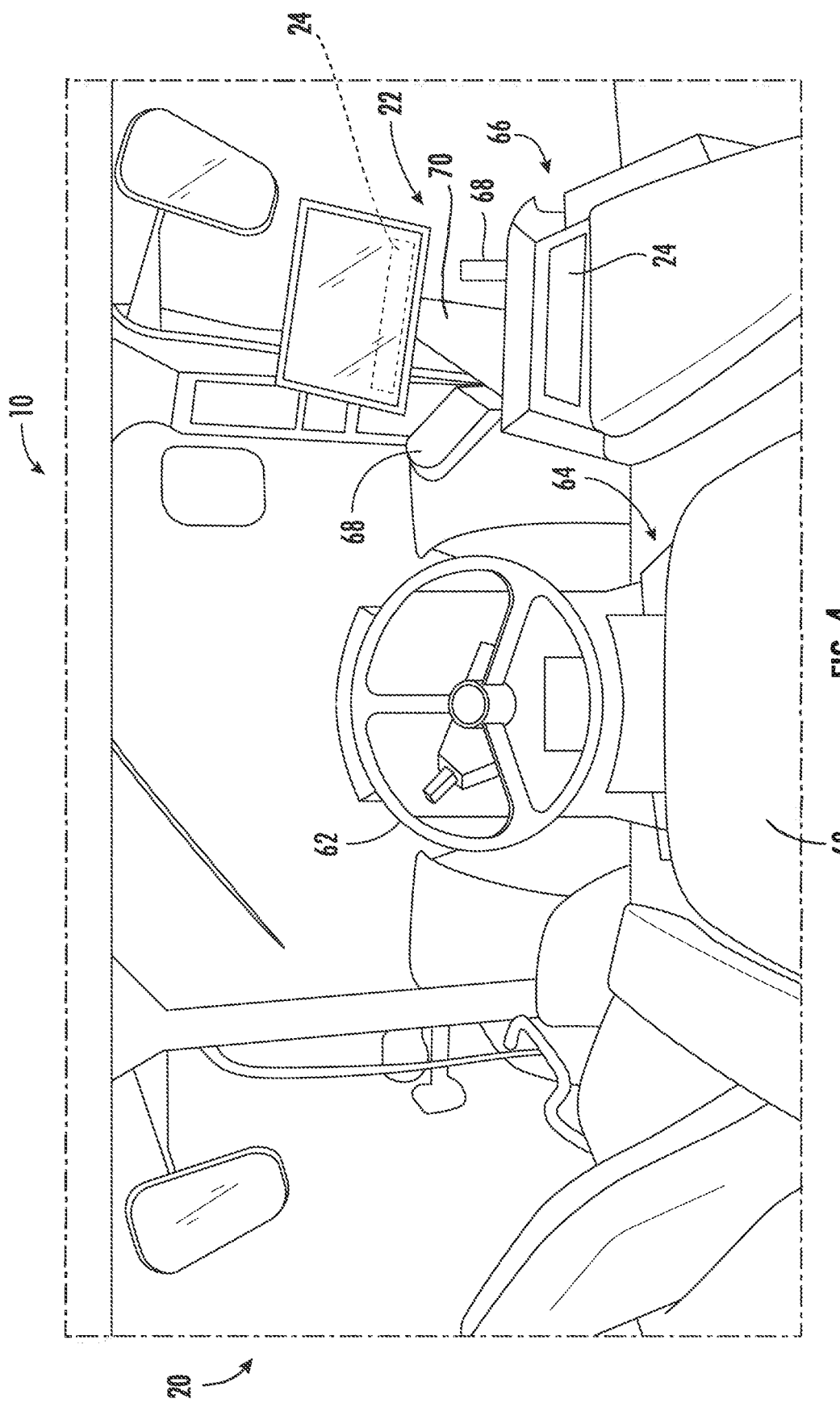
FIG. 4 illustrates a partial perspective view of a cab of the vehicle in accordance with aspects of the present subject matter.

Referring now to FIG. 4, an interior of the cab 20 of the work vehicle 10 may include a seat 60, on which the operator sits when operating the vehicle 10. In various embodiments, a steering wheel 62 is located near the seat 60, so as to be within arm's reach of the operator when the operator is seated. Though a steering wheel 62 is included in the illustrated embodiment, other embodiments of the vehicle 10 may include other devices for receiving steering inputs from the operator. For example, in place of a steering wheel 62, the cab 20 may have left/right control bars, a hand controller, pedals, or another suitable device for receiving steering inputs. Also located near the seat 60, at the operator's feet, can be one or more pedals 64. The pedals 64 may be configured to receive input from the operator for controlling the speed of the vehicle 10. For example, the pedals 64 may control a throttle, brakes, a clutch, other suitable systems, or a combination thereof. In other embodiments, the pedals 64 may be used for steering inputs. Further, in embodiments in which the vehicle 10 is semi-autonomous or fully autonomous, the steering wheel 62 and/or the pedals 64 may be omitted.

Along one or both sides of the seat 60 may be an armrest 66. The armrest 66 may include one or more hand manipulation devices 68, the HMI 22, supported by an interface mount 70, and/or one or more user input devices 24. The HMI 22 may be used to present information to the operator, such as vehicle information (e.g., ground speed, oil pressure, engine temperature, etc.), boom assembly 28 operations information (e.g., nozzle in use, agricultural product flow rate), and manufacturer proprietary systems information (e.g. Advanced Farming Systems (AFS) information, including yield maps, position data, etc.). In addition, the HMI 22 may also be capable of presenting and displaying data associated with one or more application variables that can affect the application of the agricultural product.

Figure 5:
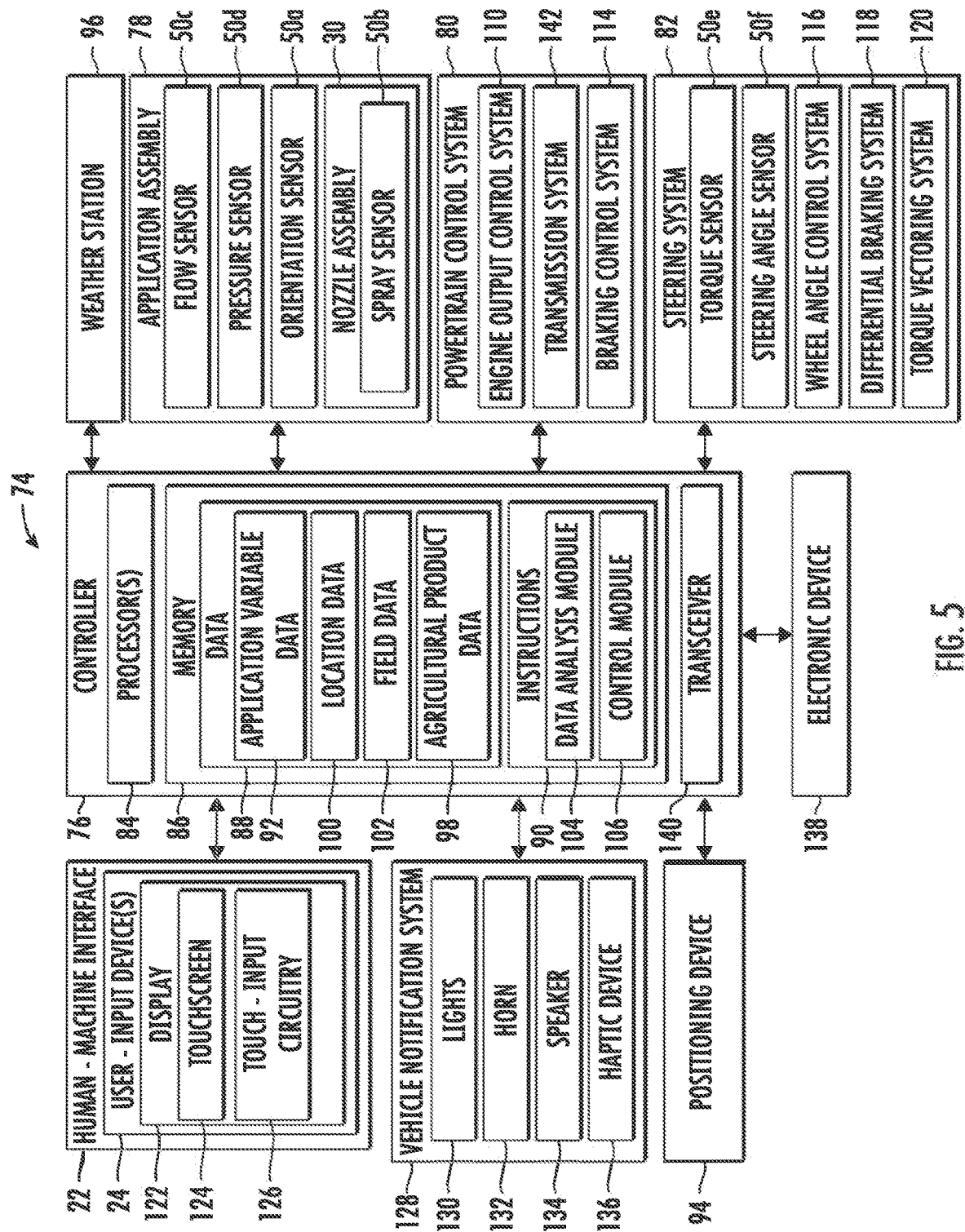
FIG. 5 illustrates a block diagram of components of a system for monitoring misapplications of an agricultural product during a spray operation in accordance with aspects of the present subject matter.
Figure 6:
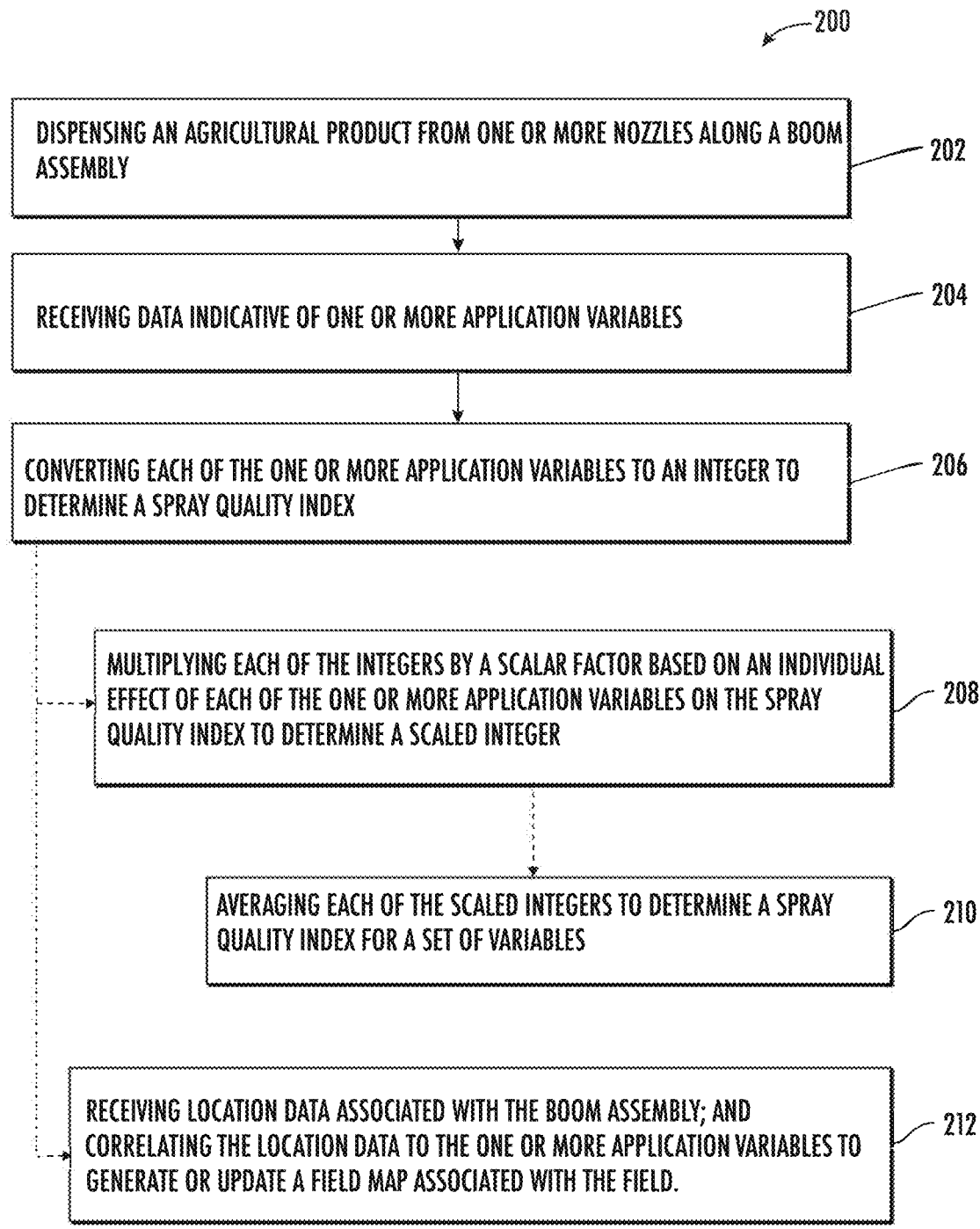
FIG. 6 illustrates a flow diagram of some embodiments of a method for monitoring a spray quality during a spray operation in accordance with aspects of the present subject matter.

Referring now to FIG. 5, a schematic view of some embodiments of a system 74 for monitoring and/or mitigating misapplications of an agricultural product during a spray operation is illustrated in accordance with aspects of the present subject matter. In general, the system 74 will be described herein with reference to the work vehicle 10 and the boom assembly 28 described above with reference to FIGS. 1-4. However, it should be appreciated that the disclosed system 74 may generally be utilized with work vehicles 10 having any suitable vehicle configuration and/or implements having any suitable implement configuration.

In several embodiments, the system 74 may include a controller 76 and various components configured to be communicatively coupled to the controller 76. As will be described in greater detail below, the controller 76 may be configured to receive data from a sensing system that includes various sensors and/or vehicle components to monitor one or more application variables and determine an overall spray quality index based on the monitored application variables, map the spray quality over a corresponding field map, generate a notification when any of the application variables deviate from a predefined range and/or from a demanded application rate, and/or store the each spray quality index at geo-located vehicle positions. In some instances, the controller 76 may also be configured to alter various components of the vehicle 10, such as the vehicle suspension 32, an agricultural product application assembly 78, a powertrain control system 80, a steering system 82, and/or any other component of the vehicle 10. By adjusting any one or more of these systems, the controller 76 may mitigate spray quality index deviations when potentially adverse conditions exist.

In general, the controller 76 may correspond to any suitable processor-based devices, such as a computing device or any combination of computing devices. Thus, as shown in FIG. 5, the controller 76 may generally include one or more processor(s) 84 and associated memory devices 86 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device 86 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device 86 may generally be configured to store information accessible to the processor(s) 84, including data 88 that can be retrieved, manipulated, created and/or stored by the processor(s) 84 and instructions 90 that can be executed by the processor(s) 84.

In several embodiments, the data 88 may be stored in one or more databases. For example, the memory device 86 may include an application variable database 92 for storing application variable data received from one or more sensor(s) 50*a-f*, a positioning device 94, a weather station 96, or any other device. Moreover, in addition to initial or raw sensor data received from the sensor(s) 50*a-f*, the positioning device 94, and/or the weather station 96, final or post-processing application variable data (as well as any intermediate application variable data created during data processing) may also be stored within the application variable database 92.

In some embodiments, the memory device 86 may also include an agricultural product database 98 that stores product information. The product information may include various information regarding the optimal conditions and rates of application for an individual product that is to be applied to the field 40. In some instances, the product information may be preloaded or sent to the vehicle 10 via wired or wireless communication therewith. Additionally, or alternatively, the product information may be manually inputted into the database. In some embodiments, based on the selected product information, a different spray quality index and/or acceptable range may be selected.

Additionally, in several embodiments, the memory device 86 may also include a location database 100 storing location information of the work vehicle 10 and/or the boom assembly 28. For example, in some embodiments, the positioning device 94 may be configured to determine the location of the work vehicle 10 and/or the boom assembly 28 by using a satellite navigation positioning device 94 (e.g. a GPS system, a Galileo positioning system, the Global Navigation satellite system (GLONASS), the BeiDou Satellite Navigation and Positioning system, a dead reckoning device, and/or the like). In such embodiments, the location determined by the positioning device 94 may be transmitted to the controller 76 (e.g., in the form location coordinates) and subsequently stored within the location database 100 for subsequent processing and/or analysis.

In several embodiments, the location data stored within the location database 100 may also be correlated to the application variable data stored within the application variable database 92. For instance, in some embodiments, the location coordinates derived from the positioning device 94 and the application variable data captured by the sensor(s) 50*a-f* and/or the weather station 96 may both be time-stamped. In such embodiments, the time-stamped data may allow each individual set of data captured by the sensor(s) 50*a-f* and/or the weather station 96 to be matched or correlated to a corresponding set of location coordinates received from the positioning device 94, thereby allowing the precise location of the portion of the field 40 associated with a given set of application variable data to be known (or at least capable of calculation) by the controller 76.

Additionally, in some embodiments, such as the one shown in FIG. 5, the memory device 86 may include a field database 102 for storing information related to the field 40, such as field map data. In such embodiments, by matching each set of application variable data captured by the sensor(s) 50*a-f* and/or the weather station 96 to a corresponding set of location coordinates, the controller 76 may be configured to generate or update a corresponding field map associated with the field 40, which may then be stored within the field database 102 for subsequent processing and/or analysis. For example, the application variable data captured by the sensor(s) 50*a-f*, the positioning device 94, and/or the weather station 96 may be mapped or otherwise correlated to the corresponding locations within the field map. Alternatively, based on the location data and the associated sensor data, the controller 76 may be configured to generate a field map that includes the geo-located application variable associated therewith. In some embodiments, the controller 76 may be configured to provide one or more maps in which each application variable is mapped independently onto the field map in an individual map. Additionally, or alternatively, the controller 76 may be configured to generate a composite map illustrating an overall geo-located spray quality index for the field 40.

With further reference to FIG. 5, in several embodiments, the instructions 90 stored within the memory device 86 of the controller 76 may be executed by the processor(s) 84 to implement a data analysis module 104 or a control module 106. In general, the data analysis module 104 may be configured to analyze the initial or raw sensor data captured by the sensor(s) 50*a-f*, the positioning device 94, and/or the weather station 96 to allow the controller 76 to calculate the spray quality index of one or more sections of the field 40. For instance, the data analysis module 104 may be configured to execute one or more suitable data processing techniques or algorithms that allows the controller 76 to accurately and efficiently analyze the sensor data, such as by applying corrections or adjustments to the data based on the sensor type, sensor resolution, and/or other variables associated with the sensor(s) 50*a-f*, the positioning device 94, and/or the weather station 96, by filtering the data to remove outliers, by implementing sub-routines or intermediate calculations to estimate the spray quality index based on one or more application variables, and/or by performing any other desired data processing-related techniques or algorithms.

In some embodiments, the controller 76 may be configured to analyze the data to determine a spray quality index for the analyzed section of the field 40 and/or whether the spray quality index is within predefined ranges. In various examples, the spray quality index may be determined by an average of sets of application variables that are monitored during the spray application. In some instances, each variable is correlated to a scaled integer based on the monitored application variable. The scaled integer may be weighted prior to or after the scaling. After each integer is scaled, the application variables may be aggregated and averaged to determine a spray quality index for each of one or more sets of application variables. In turn, each set of application variables may also be averaged to determine an overall spray quality index. In some embodiments, the controller 76 may be configured to store which variables cause variances in the spray quality index during operation of the vehicle such that the weighting of each variable may be updated based on the updated data. Accordingly, in some examples, the system 74 may form a closed-loop system in which detected data is fed to the controller 76 to recalculate the weighted prior to or after the scaling of each application variable.

In some examples, the one or more application variables includes at least a first and a second application variable. In some instances, the first application variable is weighted differently from that of the second application variable in determining the spray quality index based on each factor's ultimate effect on the overall application of the agricultural product to the field 40. For instance, in some embodiments, the controller 76 may receive, from the one or more sensors 50*a*-50*f*, data associated with the first and second application variables and calculate the spray quality index based on the received data. Further, in some examples, the first application variable may have a first scaling factor and a second application variable may have a second scaling factor. In some instances, the second scaling factor may differ from the first scaling factor.

The control module 106 may provide instructions for various other components communicatively coupled with the controller 76 based on the results of the data analysis module 104. For example, the control module 106 may provide notification instructions to a vehicle notification system 128, the HMI 22, and/or a remote electronic device 138 if any of the one or more application variables deviates from a predefined range or the spray quality index deviates from a predefined range as such an occurrence may cause an inadequate application to a portion of the field 40.

In several embodiments, the data captured by the sensor(s) 50a-f, the positioning device 94, and/or the weather station 96 may each be configured to detect one or more parameters indicative of one or more field conditions associated with an adjacent field swath as the vehicle 10 makes a pass along a current field swath. In such embodiments, the field-related data generated by the sensor(s) 50a-f, the positioning device 94, and/or the weather station 96 may be used by the controller 76 to monitor the associated field condi-tion(s) of the adjacent swath. The data analysis module 104 may record the monitored field condition(s) within the memory device 86, including generating a field map that geo-locates the field condition data across the adjacent swath. As such, when the vehicle 10 makes a subsequent pass across the field along the previously marked/mapped swath, the field condition data may be used to actively control various operations of the vehicle 10 through the control module 106, such as by making a one-time adjustment to one or more operating parameters associated with the operation of the vehicle 10 and/or the boom assembly 28 prior to making the subsequent pass based on the field condition data generated for the adjacent swath or by actively adjusting one or more operating variables associated with the operation of the vehicle 10 and/or the boom assembly 28 as the vehicle 10 and/or the boom assembly 28 make the subsequent pass based on the field condition data to provide on-the-fly adjustments to accommodate localized variations in the monitored field condition(s) along all or a portion of the swath. Additionally, and/or alternatively, the control module 106 may provide notification instructions to a vehicle notification system 128, the HMI 22, and/or a remote electronic device 138 to adjust one or more components based on the field condition data generated for the adjacent swath.

Referring still to FIG. 5, in some embodiments, the mobile weather station 96 can be mounted to the vehicle 10, the boom assembly 28, and/or other locations. The mobile weather station 96 can contain any of the sensors that monitor one or more weather variables, such as temperature, wind speed, wind direction, relative humidity, barometric pressure, cloud cover, and trends thereof. During operation, if one or more of the criteria changes, such as the wind direction or speed changes, the changes can alter the ability to uniformly apply the agricultural product to the field 40. By using the information provided by the mobile weather station 96, the system 74 can determine when inclement weather exists for the spray operation. In some embodiments, each of the one or more weather variables may be individually scaled based on each of the one or more criteria's effect on the overall change to the spray application. For instance, in some cases, wind speed may have a greater effect of the spray quality than cloud cover. Thus, the wind speed may be scaled to have a greater impact on the weather variable that is obtained by the controller 76 than the cloud coverage.

In some embodiments, a set of variables $v_w$ that are related to the weather during the spray operation may be calculated by the following equation:

$$v_w = \frac{\sum_{1}^{n}(x_1 c_1) + \ldots + (x_n c_n)}{N_c} \quad (1)$$

where $v_w$ is the summation of the weather variables, $c_1$ to $c_n$ are the one or more weather variables, $x_1$ to $x_n$ are the scaling factors for each of the one or more weather variables, and $N_c$ is the number of weather variable $c_1$ to $c_n$ in the numerator of equation (1). In some instances, each of the one or more weather variables $c_1$ to $c_n$ is correlated to a scaled integer based on a conversion from the raw data as detected by the weather station 96 to a look-up table(s), suitable mathematical formula, and/or algorithms. In some instances, the scaling may convert the raw data to a range for each of the one or more weather variables $c_1$ to $c_n$. In some examples, each scaled integer may be weighted simultaneously with the conversion such that each of the one or more weather variables $c_1$ to $c_n$ define various ranges or after the scaling such that each of the one or more weather variables $c_1$ to $c_n$ define a common range. After each of the one or more weather variables $c_1$ to $c_n$ is scaled, the one or more weather variables $c_1$ to $c_n$ may be aggregated and averaged to determine a spray quality index for the weather variable $v_w$.

With further reference to FIG. 5, the controller 76 is operably coupled with the agricultural product application assembly 78 that may be configured to dispense a product from the product tank 26 to the field 40 through a nozzle assembly 108. The nozzle assembly 108 may selectively dispense the fan 48 of the agricultural product stored within the tank 26 onto the underlying field 40 and/or plants 42 at a target application rate. In general, the target application rate for an agricultural product is an amount (e.g., a volume or weight) of the substance to be applied per unit area of the field 40 (e.g., per acre) to provide the desired agricultural outcome (e.g., weed coverage reduction, pest reduction, and/or the like).

In various embodiments, one or more spray sensors 50b are configured to capture data indicative of one or more spray quality variables associated with one or more fans 48 of the agricultural product being dispensed by the boom assembly 28. Additionally, in some embodiments, a flow sensor 50c may detect a flow rate of agricultural product through the application assembly 78 and a distribution line pressure within the application assembly 78 may be detected by a pressure sensor 50d, which may correspond to the pressure sensor 56 described in reference FIG. 3, both of which may provide a measure of spray quantity and droplet size of the agricultural product being dispensed from the one or more nozzle assemblies 30.

As the boom assembly 28 travels across the field 40 to perform the spraying operation thereon, the controller 76 may be configured to receive the captured data from the spray sensors 50b, the flow sensor 50c, and/or the pressure sensor 50d. The determined spray quality variable(s) may correspond to any suitable variable(s)/characteristic(s) indicative of the quality of the spray fans 48 being dispensed by the nozzle assembly 108. Thereafter, the controller 76 may be configured to process/analyze the received data to determine or estimate the spray quality variable value(s) for the nozzle assembly 108. For instance, the controller 76 may include a look-up table(s), suitable mathematical formula, and/or algorithms stored within its memory device 86 that correlates the received sensor data to the spray quality variable value(s). In such embodiments, the controller 76 may be configured to analyze the received data to determine the shape(s) and/or size(s) (e.g., the width(s)) of the detected spray fan(s) 48. Additionally, the controller 76 may be configured to analyze the received image data to determine the size of the droplets or particles forms the imaged spray fan(s) 48.

Further, in various examples, a movement sensor(s) 50*a* may generally correspond to any suitable sensing devices for detecting data related to position, angle, displacement, distance, speed, acceleration of any component of the boom assembly 28. For example, in some embodiments, the movement sensor(s) 50*a* may correspond to an imaging sensor 52 (an area-type image sensor, such as a CCD or a CMOS image sensor, and image-capturing optics that capture an image of an imaging field of view 54), as described in reference to FIG. 3. Additionally, or alternatively, in some embodiments, the movement sensor may be configured as a light detection and ranging (LIDAR) sensors that are configured to emit one or more output signals for reflection off of the ground surface and receive or sense the return signal(s). Additionally, or alternatively, the movement sensor(s) 50*a* may correspond to an a radio detection and ranging (RADAR) sensor(s), a Hall effect sensor(s), a gyroscope sensor(s), a magnetometer sensor(s), an accelerometer sensor(s), a yaw-rate sensor(s), a piezoelectric sensor(s), a position sensor(s), a complementary metal-oxide-semiconductor (CMOS) sensor(s), a pressure sensor(s), a capacitive sensor(s), an ultrasonic sensor(s), or any other suitable type of sensor(s). In some examples, when movement beyond a predefined range is detected by the movement sensor 50*a*, a notification may be generated by the controller 76.

In some embodiments, a set of variables $v_s$ that is monitored by one or more sensors 50*b-d* of the system 74 may define a sensor variable $v_s$ that may be calculated by the following equation:

$$v_s = \frac{\sum_{1}^{n} (x_1 s_1) + \ldots + (x_n s_n)}{N_s} \tag{2}$$

where $v_s$ is a summation of the variables detected by the sensors, $s_1$ to $s_n$ are the one or more application variables detected by the sensors, $x_1$ to $x_n$ are the scaling factors for each of the one or more detected variables, and $N_s$ is the number of variables detected by the sensors $s_1$ to $s_n$ in the numerator of equation (2). In some instances, each of the one or more application variables detected by the sensors $s_1$ to $s_n$ is correlated to a scaled integer based on a conversion from the raw data as detected by the sensors 50*b-d* to a look-up table(s), suitable mathematical formula, and/or algorithms. In some instances, the scaling may convert the raw data to a range for each of the one or more application variables detected by the sensors $s_1$ to $s_n$. In some examples, each scaled integer may be weighted simultaneously with the conversion such that each of the one or more application variables detected by the sensors $s_1$ to $s_n$ define various ranges or after the scaling such that each of the one or more application variables detected by the sensors $s_1$ to $s_n$ define a common range. After each of the one or more application variables detected by the sensors $s_1$ to $s_n$ is scaled, the one or more application variables detected by the sensors $s_1$ to $s_n$ may be aggregated and averaged to determine a spray quality index for the sensor variable $v_s$.

In some embodiments, a powertrain control system 80 includes an engine output control system 110, a transmission control system 112, and a braking control system 114. Through the usage of any of these systems, the controller 76 may collect data related to one or more of the application variables during operation of the vehicle 10 and/or during a spray operation. For instance, the engine output control system 110 is configured to vary the output of the engine to control the speed of the vehicle 10 by varying a throttle setting of the engine, a fuel/air mixture of the engine, a timing of the engine, and/or other suitable engine variables to control engine output. In addition, the transmission control system 112 may adjust gear selection within a transmission to control the speed of the vehicle 10. Furthermore, the braking control system 114 may adjust braking force, thereby controlling the speed of the vehicle 10. While the illustrated powertrain control system 80 includes the engine output control system 110, the transmission control system 112, and the braking control system 114, it should be appreciated that alternative embodiments may include one or two of these systems, in any suitable combination. Further embodiments may include a powertrain control system 80 having other and/or additional systems to facilitate adjusting the speed of the vehicle 10.

In some embodiments, a set of variables $v_{pcs}$ that is provided by the powertrain control system 80 may be calculated by the following equation:

$$v_{pcs} = \frac{\sum_{1}^{n} (x_1 p_1) + \ldots + (x_n p_n)}{N_p} \tag{3}$$

where $v_{pcs}$ is the summation of the variables provided by the powertrain control system 80, $p_1$ to $p_n$ are the one or more application variables provided by the powertrain control system 80, $x_1$ to $x_n$ are the scaling factors for each of the one or more application variables provided by the powertrain control system 80, and $N_p$ is the number of variables $p_1$ to $p_n$ provided by the powertrain control system 80 in the numerator of equation (3). In some instances, each of the one or more application variables $p_1$ to $p_n$ provided by the powertrain control system 80 is correlated to a scaled integer based on a conversion from the raw data as detected by the weather station 96 to a look-up table(s), suitable mathematical formula, and/or algorithms. In some instances, the scaling may convert the raw data to a range for each of the one or more application variables $p_1$ to $p_n$ provided by the powertrain control system 80. In some examples, each scaled integer may be weighted simultaneously with the conversion such that each of the one or more application variables $p_1$ to $p_n$ provided by the powertrain control system 80 define various ranges or after the scaling such that each of the one or more application variables $p_1$ to $p_n$ provided by the powertrain control system 80 define a common range. After each of the one or more application variables $p_1$ to $p_n$ provided by the powertrain control system 80 is scaled, the one or more application variables $p_1$ top, provided by the powertrain control system 80 may be aggregated and averaged to determine a spray quality index for the powertrain control system variable $v_{pcs}$.

Still referring to FIG. 5, a steering system 82 can include a torque sensor 50e, a steering angle sensor 50f, a wheel angle control system 116, a differential braking system 118, and/or a torque vectoring system 120 that may be used to steer (e.g., adjust the steering angle) the vehicle 10. Each of these components may monitor and/or control a function of the steering system 82 of the vehicle 10. The steering angle sensor 50f may provide data related to an instantaneous steering direction of the vehicle 10 while the torque sensor 50e may sense a torque on the steering wheel 62 indicating an operator's intention for manipulating the steering system 82. The manipulation of the direction and speed of alteration are variables that effect the spray operation and, therefore, the controller 76 may provide notifications if one or more of variables within the steering system 82 either exceed a predefined range or if the actions taken by the steering system 82 contribute to a spray quality index exceeding a predefined range.

The wheel angle control system 116 may rotate one or more wheels 14, 16 (FIG. 1) or tracks of the vehicle 10 (e.g., via hydraulic actuators) to steer the vehicle 10 based at least in part on the initial curvature of the virtual path. By way of example, the wheel angle control system 116 may rotate front wheels/tracks 14, rear wheels/tracks 16, and/or intermediate wheels/tracks of the vehicle 10, either individually or in groups. The differential braking system 118 may independently vary the braking force on each lateral side of the vehicle 10 to direct the vehicle 10. Similarly, the torque vectoring system 120 may differentially apply torque from the engine to wheels 14, 16 and/or tracks on each lateral side of the vehicle 10. Further embodiments may include a steering system 82 having other and/or additional systems to facilitate directing the vehicle 10 based at least in part on respective initial curvatures of the iteratively calculated virtual paths (e.g., an articulated steering system, differential drive system, etc.), for example.

In some embodiments, a set of variables $v_{st}$ that is provided by the steering system 82 may be calculated by the following equation:

$$v_{st} = \frac{\sum_{1}^{n}(x_1 st_1) + \ldots + (x_n st_n)}{N_{st}} \quad (4)$$

where $v_{st}$ is a summation of the variables provided by the steering system 82, $st_1$ to $st_n$ are the one or more application variables provided by the steering system 82, $x_1$ to $x_n$ are the scaling factors for each of the one or more application variables $st_1$ to $st_n$ provided by the steering system 82, and $N_{st}$ is the number of variables $st_1$ to $st_n$ provided by the steering system 82 in the numerator of equation (4). In some instances, each of the one or more application variables $st_1$ to $st_n$ provided by the steering system 82 is correlated to a scaled integer based on a conversion from the raw data as detected by the weather station 96 to a look-up table(s), suitable mathematical formula, and/or algorithms. In some instances, the scaling may convert the raw data to a range for each of the one or more application variables $st_1$ to $st_n$ provided by the steering system 82. In some examples, each scaled integer may be weighted simultaneously with the conversion such that each of the one or more application variables $st_1$ to $st_n$ provided by the steering system 82 define various ranges or after the scaling such that each of the one or more application variables $st_1$ to $st_n$ provided by the steering system 82 define a common range. After each of the one or more application variables $st_1$ to $st_n$ provided by the steering system 82 is scaled, the one or more application variables $st_1$ to $st_n$ provided by the steering system 82 may be aggregated and averaged to determine a spray quality index for the steering system variable $v_{st}$.

In some embodiments, each of the summation of variables $v_w$, $v_s$, $v_{pcs}$, and $v_{st}$ are calculated and correlated to an integer that shares a common range. For instance, each of the sets of variables $v_w$, $v_s$, $v_{pcs}$, and $v_{st}$ may be converted to an integer between 0 and 100 (or any other range) that is indicative of an estimated spray quality based on the application variable with 0 being a highly likely misapplication of agricultural product and 100 being a highly likely proper application of agricultural product. For instance, with the summation of the variables $v_{pcs}$ provided by the powertrain control system 80, an integer below 50, when the correlated integers range from 0 to 100, may indicate that the vehicle 10 is traveling to quickly thereby likely causing an under-application of the agricultural product or the vehicle 10 is traveling too slowly thereby likely causing an overapplication of agricultural product. Conversely, if the summation of the variables $v_{pcs}$ provided by the powertrain control system 80 is an integer above 80, when the correlated integers range from 0 to 100, the integer may indicate that the powertrain control system 80 is operating appropriately for proper application of the agricultural product to the underlying field 40. As provided herein, each agricultural product may be correlated to a different integer based on the application guidelines for that agricultural product.

In order to calculate the overall spray quality index, each set of variables $v_w$, $v_{pcs}$, and $v_{st}$ may be averaged to provide an overall spray quality index, which may be calculated by the following equation:

$$SQI = \frac{v_w + v_s + v_{pcs} + v_{st} + v_n}{N_v} \tag{5}$$

in which SQI is the overall spray quality index of the spray operation, $v_w$ is the average integer representing the application variables provided by from the weather station 96, $v_s$ is the average integer detected by the sensors, $v_{pcs}$ is the average integer representing the application variables provided by the powertrain control system 80, $v_{st}$ is the average integer representing the application variables provided by the steering system 82, $v_n$ is the average integer representing the application variables provided by any additional variables that effect the spray quality index that are then correlated to an integer within a common range as the other variables, and $N_v$ is the number of integers. In various embodiments, any other system and/or sensor that may be operably coupled with the vehicle 10 for detecting any variable that may affect the spray quality during a spray operation may also be calculated and included in the spray quality index without departing from the teachings provided herein. It will be appreciated that in other examples, any other formula and/or algorithm may be used to determine a spray quality index based on monitored application variables without departing from the scope of the present disclosure.

In some examples, the HMI 22 may include a display 122 having a touchscreen 124 mounted within a cockpit module, an instrument cluster, and/or any other location within the vehicle 10. The display 122 may be capable of displaying information related to the spray quality index or any other information. In some embodiments, the HMI 22 may include an input device 24 in the form of circuitry 126 within the touchscreen 124 to receive an input corresponding with a location over the display 122. Other forms of input, including one or more joysticks, digital input pads, or the like can be used in place or in addition to the touchscreen 124. In some instances, a predefined range defined by a lower and upper threshold for the spray quality index may be set, either as an initial/default value or range or as an operator defined value or range through the touchscreen 124 and/or any other user input device 24. The predefined range may be agricultural product specific. If the spray quality index deviates from the predefined range, a notification may be provided to a user through the HMI 22, a vehicle notification system 128, an electronic device 138, and/or through any other device.

In some embodiments, the vehicle notification system 128 may prompt visual, auditory, and tactile notifications and/or warnings. For instance, vehicle brake lights 130 and/or vehicle emergency flashers may provide a visual alert. A vehicle horn 132 and/or speaker 134 may provide an audible alert. A haptic device 136 integrated into the steering wheel 62, the seat 60, the armrest 66, and/or any other location may provide a tactile alert. In addition to providing the notification to the operator, the controller 76 may additionally store the location of the vehicle 10 at the time of the notification. The stored location may be displayed through a field map to illustrate locations of the field 40 in which an agricultural product may have been misapplied.

Further, the system 74 may communicate via wired and/or wireless communication with one or more remote electronic devices 138 through a transceiver 140. The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The electronic device 138 may also include a display for displaying information to a user. For instance, the electronic device 138 may display one or more user interfaces and may be capable of receiving remote user inputs to set a predefined range for any of the application variables and/or to input any other information, such as the agricultural product to be used in a spray operation. In addition, the electronic device 138 may provide feedback information, such as visual, audible, and tactile alerts. It will be appreciated that the electronic device 138 may be any one of a variety of computing devices and may include a processor and memory. For example, the electronic device 138 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols.

In some embodiments, the system 74 may also provide the operator with various mitigation techniques for returning the spray quality index to operation within the predefined range and/or for manipulating one or more variable to return the spray quality index to a predefined range. For example, when inclement weather is detected, the notification may provide a weather update and an estimate on when the weather will return to a more optimal condition for continuing the spray operation. Additionally, or alternatively, when an incorrect nozzle assembly 30 or a poorly functioning nozzle assembly 30 is detected, the notification may provide information relating to the location of the poorly performing nozzle assembly 30 and/or information relating to the model of the nozzle assembly 30 for providing an appropriate replacement.

Additionally, or alternatively, when an incorrect application rate is detected, the controller 76 may provide instructions 90 for altering a function of the vehicle 10 that assists in correcting the application rate. It will be appreciated that notifications provided by the controller 76 may include any other information relating to any other component of the vehicle 10 and/or the boom assembly 28 and mitigation instructions 90 for mitigating any issue that may occur in relation to those components.

As provided herein, each variable may be individually weighted by a scaling factor based on their effect on the overall spray quality index. Therefore, when providing the operator with various mitigation techniques for returning the spray quality index to operation within the predefined range, the system 74 may determine which variable is best to manipulate to achieve the desired spray quality index. Thus, while the vehicle 10 may be moving too fast, the system may provide not only mitigation instructions 90 that slowing the vehicle 10 will increase the spray quality index, but adjusting a flow rate of the agricultural product may also accomplish the desired results. Accordingly, to mitigate the deficiencies of a first variable, the first variable or any other variable may be manipulated to achieve a desired spray quality index.

Referring now to FIG. 6, a flow diagram of some embodiments of a method 200 for monitoring a spray quality during a spray operation is illustrated in accordance with aspects of the present subject matter. In general, the method 200 will be described herein with reference to the vehicle 10, the boom assembly 28, and the system 74 described above with reference to FIGS. 1-5. However, it should be appreciated by those of ordinary skill in the art that the disclosed method 200 may generally be utilized to monitor one or more application variables of any suitable applicator associated with any suitable agricultural vehicle 10 and/or may be utilized in connection with a system having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include dispensing an agricultural product from one or more nozzle assemblies 30 along the boom assembly 28. The nozzle assemblies 30 dispense or otherwise spray a fan 48 of the agricultural product onto the underlying field 40 and/or plants 42.

At (204), the method 200 may include receiving data indicative of a plurality of application variables. In several embodiments, the one or more application variables that may affect the spray quality index can include any spray operation scaling factor that may have an effect on an overall spray quality during an application of agricultural product to the underlying field 40. For instance, the application variables can include at least one of a nozzle size and style, which agricultural product is being applied, an incorrect agricultural product application rate, inclement weather as determined by meeting one or more criteria, an agricultural product flow rate or pressure deviating from a predefined range, boom assembly movement (e.g., jounce) exceeding a movement range, a vehicle exceeding a predefined speed, a vehicle acceleration/deceleration deviating from a predefined range, a turning radius exceeding predefined criteria, and/or any other variable.

In several embodiments, the data is received from one or more sensors and/or systems that may be positioned on the vehicle 10, on the boom assembly 28, or at any other location for monitoring a condition that effects the overall spray operation of the agricultural product. As provided herein, the data is analyzed by a controller 76 and each of the various forms of data is categorized into a variable.

At step (206), the method 200 includes converting each of the one or more application variables to an integer to determine a spray quality index. For instance, each of the one or more application variables may be converted an integer between 0 and 100 (or any other range) that is indicative of an estimated spray quality based on the application variable with 0 being a highly likely misapplication and 100 being a highly likely proper application of agricultural product.

At step (206), the method 200 may include multiplying each of the integers by a scaling factor based on an individual effect of each of the one or more application variables on the spray quality index to determine a scaled integer. As provided herein, each application variable may have a greater or lesser effect than other application variables on the overall spray quality index. Thus, each application variable may have a defined scaling factor based on the end effect of the spray quality index. In some instances, each scaling factor may be predefined and stored in the memory device 86 of the controller 76. Additionally, or alternatively, the scaling factor may be updated through a closed loop control system within the controller 76 that provides updated scaling factors based on the monitored results of the spray operation, the spray quality index, and possibly, input from an operator. In some instances, each scaled integer is weighted simultaneously with the converting such that each of the one or more application variables define various ranges. In other instances, each scaled integer is weighted after the scaling such that each of the one or more application variables define a common range.

At step (208), the method 200 may include averaging each of the scaled integers to determine a spray quality index for a set of variables. As provided herein, each set of variables may be obtained from a system of the vehicle 10, a device, a sensor, and/or a combination thereof. Based on each set of variables, a user may quickly determine which system of the vehicle 10 is leading to a calculated spray quality index.

Lastly, at step (210), the method 200 may include receiving location data associated with the boom assembly 28 correlating the location data to the one or more application variables to generate or update a field map associated with the field 40.

It is to be understood that the steps of the method 200 is performed by the controller upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein, such as the method 200, is implemented in software code or instructions which are tangibly stored on a tangible computer readable medium. The controller loads the software code or instructions via a direct interface with the computer readable medium or via a wired and/or wireless network. Upon loading and executing such software code or instructions by the controller, the controller may perform any of the functionality of the controller described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

A variety of advantages may be derived from the use of the present disclosure. For example, use of the system and method provided herein can lead to advantages that include, but are not limited to cost, strength, durability, life cycle cost, marketability, appearance, packaging, size, serviceability, weight, manufacturability, ease of assembly, etc.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural work vehicle comprising:
   a chassis supporting a cab and a boom assembly;
   one or more nozzle assemblies positioned along the boom assembly and configured to selectively dispense an agricultural product therefrom;
   a sensor operably coupled with the boom assembly and configured to capture data associated with one or more application variables; and
   a controller communicatively coupled to the sensor, the controller configured to receive, from the sensor, the data associated with the one or more application variables and calculate a spray quality index defined between an upper integer and a lower integer based on the one or more application variables, the upper integer and the lower integer being determined based on a scaling and weighting of the one or more application variables, wherein the weighting of the one or more application variables is altered as the one or more nozzle assemblies positioned along the boom assembly selectively dispense the agricultural product therefrom.

2. The agricultural work vehicle of claim 1, wherein the controller is further configured to provide a notification within the cab when the spray quality index deviates from a predefined range.

3. The agricultural work vehicle of claim 1, wherein the controller is further configured to provide a mitigation instruction based on the spray quality index exceeding a predefined range.

4. The agricultural work vehicle of claim 1, further comprising:
an imaging sensor configured to detect one or more application variables, wherein the one or more application variables include at least one of an orifice type of the one or more nozzle assemblies or a mixture of materials defining the agricultural product.

5. The agricultural work vehicle of claim 3, further comprising:
a positioning device communicatively coupled to the controller, the controller being configured to receive location data from the positioning device associated with the boom assembly and correlate the location data to the one or more application variables to generate or update a field map associated with a field.

6. The agricultural work vehicle of claim 5, further comprising:
a display within a human-machine interface (HMI) and configured to provide the field map thereon.

7. The agricultural work vehicle of claim 4, wherein the controller is further configured to store variables that cause a variance in the spray quality index during operation of the vehicle.

8. An agricultural work vehicle comprising:
a chassis supporting a boom assembly;
one or more nozzle assemblies positioned along the boom assembly and configured to selectively dispense an agricultural product therefrom;
an imaging sensor operably coupled with the boom assembly and configured to capture data associated with one or more application variables; and
a controller communicatively coupled to the imaging sensor, the controller configured to receive, from the imaging sensor, the data associated with the one or more application variables and calculate a spray quality index defined between an upper integer and a lower integer based on the one or more application variables, the upper integer and the lower integer being determined based on a scaling and weighting of the one or more application variables, wherein the weighting of the one or more application variables is altered as the one or more nozzle assemblies positioned along the boom assembly selectively dispense the agricultural product therefrom.

9. The agricultural work vehicle of claim 8, wherein the controller is further configured to provide a notification when the spray quality index deviates from a predefined range.

10. The agricultural work vehicle of claim 8, wherein the controller is further configured to provide a mitigation instruction based on the spray quality index exceeding a predefined range.

11. The agricultural work vehicle of claim 8, wherein the one or more application variables include at least one of an orifice type of the one or more nozzle assemblies or a mixture of materials defining the agricultural product.

12. The agricultural work vehicle of claim 8, further comprising:
a positioning device communicatively coupled to the controller, the controller being configured to receive location data from the positioning device associated with the boom assembly and correlate the location data to the one or more application variables to generate or update a field map associated with a field.

13. The agricultural work vehicle of claim 12, further comprising:
a display within a human-machine interface (HMI) and configured to provide the field map thereon.

14. The agricultural work vehicle of claim 8, wherein the controller is further configured to store variables that cause a variance in the spray quality index during operation of the vehicle.

15. An agricultural work vehicle comprising:
a chassis supporting a boom assembly;
one or more nozzle assemblies positioned along the boom assembly and configured to selectively dispense an agricultural product therefrom;
a sensor operably coupled with the boom assembly and configured to capture data associated with one or more application variables; and
a controller communicatively coupled to the sensor, the controller configured to:
receive, from the sensor, the data associated with the one or more application variables;
calculate a spray quality index defined between an upper integer and a lower integer based on the one or more application variables, the upper integer and the lower integer being determined based on a scaling and weighting of the one or more application variables, wherein the weighting of the one or more application variables is altered as the one or more nozzle assemblies positioned along the boom assembly selectively dispense the agricultural product therefrom; and
provide a notification when the spray quality index deviates from a predefined range.

16. The agricultural work vehicle of claim 15, wherein the controller is further configured to provide a mitigation instruction based on the spray quality index exceeding a predefined range.

17. The agricultural work vehicle of claim 15, further comprising:
an imaging sensor configured to detect one or more application variables, wherein the one or more application variables include at least one of an orifice type of the one or more nozzle assemblies or a mixture of materials defining the agricultural product.

18. The agricultural work vehicle of claim 15, further comprising:
a positioning device communicatively coupled to the controller, the controller being configured to receive location data from the positioning device associated with the boom assembly and correlate the location data to the one or more application variables to generate or update a field map associated with a field.

19. The agricultural work vehicle of claim 18, further comprising:
a display within a human-machine interface (HMI) and configured to provide the field map thereon.

20. The agricultural work vehicle of claim 15, wherein the controller is further configured to store variables that cause a variance in the spray quality index during operation of the vehicle.

* * * * *